(12) United States Patent
genannt Berghegger

(10) Patent No.: US 8,976,549 B2
(45) Date of Patent: Mar. 10, 2015

(54) STARTUP CIRCUIT INCLUDING FIRST AND SECOND SCHMITT TRIGGERS AND POWER CONVERTER EMPLOYING THE SAME

(75) Inventor: Ralf Schroeder genannt Berghegger, Glandorf (DE)

(73) Assignee: Power Systems Technologies, Ltd., Ebene (MU)

( * ) Notice: Subject to any disclaimer, the term of this patent is extended or adjusted under 35 U.S.C. 154(b) by 704 days.

(21) Appl. No.: 12/630,602

(22) Filed: Dec. 3, 2009

(65) Prior Publication Data

US 2011/0134664 A1 Jun. 9, 2011

(51) Int. Cl.
*H02M 1/00* (2006.01)
*H02M 1/36* (2007.01)

(52) U.S. Cl.
CPC ..................................... *H02M 1/36* (2013.01)
USPC ........................................................... 363/49

(58) Field of Classification Search
USPC .................. 323/288; 363/21.12, 49
See application file for complete search history.

(56) References Cited

U.S. PATENT DOCUMENTS

| | | |
|---|---|---|
| 1,376,978 A | 5/1921 | Stoekle |
| 2,473,662 A | 6/1949 | Pohm |
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,602,795 A | 8/1971 | Gunn |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,011,498 A | 3/1977 | Hamsra |
| 4,019,122 A | 4/1977 | Ryan |
| 4,075,547 A | 2/1978 | Wroblewski |
| 4,202,031 A | 5/1980 | Hesler et al. |

(Continued)

FOREIGN PATENT DOCUMENTS

| | | |
|---|---|---|
| CN | 2904469 Y | 5/2007 |
| CN | 101141099 | 3/2008 |

(Continued)

OTHER PUBLICATIONS

Chhawchharia, P., et al., "On the Reduction of Component Count in Switched Capacitor DC/DC Convertors," Hong Kong Polytechnic University, IEEE, 1997, Hung Horn, Kowloon, Hong Kong, pp. 1395-1401.

(Continued)

*Primary Examiner* — Jue Zhang
*Assistant Examiner* — Lakaisha Jackson
(74) *Attorney, Agent, or Firm* — Boisbrun Hofman, PLLC

(57) ABSTRACT

A startup circuit with reduced power dissipation, method of operating the same and a power converter employing the startup circuit. In one embodiment, the startup circuit for a controller includes a charge accumulation circuit having a resistor series-coupled to a capacitor and a first Schmitt trigger having an input coupled to the capacitor. The startup circuit also includes a second Schmitt trigger having an input coupled to an output of the first Schmitt trigger and configured to provide a bias voltage for the controller via the capacitor when an input voltage thereto exceeds a trip voltage.

20 Claims, 3 Drawing Sheets

(56) References Cited

U.S. PATENT DOCUMENTS

| | | |
|---|---|---|
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,055,991 A | 10/1991 | Carroll |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Hüsgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,636,116 A | 6/1997 | Milavec et al. |
| 5,661,642 A | 8/1997 | Shimashita |
| 5,663,876 A | 9/1997 | Newton et al. |
| 5,671,131 A | 9/1997 | Brown |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A | 11/1999 | Naveed |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,374 A | 12/2000 | Hayes et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |

(56) References Cited

U.S. PATENT DOCUMENTS

| | | |
|---|---|---|
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,563,725 B2 | 5/2003 | Carsten |
| 6,570,268 B1 | 5/2003 | Perry et al. |
| 6,580,627 B2 | 6/2003 | Takahashi |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,636,025 B1 | 10/2003 | Irissou |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,533 B2 * | 9/2005 | Okuno ............................ 323/222 |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,375,994 B2 | 5/2008 | Andreycak |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,626,370 B1 * | 12/2009 | Mei et al. ...................... 323/282 |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 * | 10/2010 | Morikawa ...................... 361/160 |
| 7,847,535 B2 | 12/2010 | Meynard et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,134,443 B2 | 3/2012 | Chandrasekaran et al. |
| 8,179,699 B2 | 5/2012 | Tumminaro et al. |
| 8,184,456 B1 | 5/2012 | Jain et al. |
| 8,278,889 B2 | 10/2012 | Tateishi |
| 8,467,199 B2 | 6/2013 | Lee et al. |

(56) References Cited

U.S. PATENT DOCUMENTS

| | | |
|---|---|---|
| 8,488,355 B2 | 7/2013 | Berghegger |
| 8,520,414 B2 | 8/2013 | Garrity et al. |
| 8,520,420 B2 | 8/2013 | Jungreis et al. |
| 8,638,578 B2 | 1/2014 | Zhang |
| 8,643,222 B2 | 2/2014 | Brinlee et al. |
| 8,767,418 B2 | 7/2014 | Jungreis et al. |
| 8,787,043 B2 | 7/2014 | Berghegger |
| 8,792,256 B2 | 7/2014 | Berghegger |
| 8,792,257 B2 | 7/2014 | Berghegger |
| 2001/0020886 A1 | 9/2001 | Matsumoto et al. |
| 2001/0055216 A1 | 12/2001 | Shirato |
| 2002/0044463 A1 | 4/2002 | Bontempo et al. |
| 2002/0057080 A1 | 5/2002 | Telefus et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |
| 2003/0039129 A1 | 2/2003 | Miyazaki et al. |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0174147 A1 | 9/2004 | Vinciarelli |
| 2004/0196672 A1 | 10/2004 | Amei |
| 2004/0200631 A1 | 10/2004 | Chen |
| 2004/0201380 A1 | 10/2004 | Zimmerman et al. |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0207189 A1 | 9/2005 | Chen |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2005/0286270 A1 | 12/2006 | Petkov et al. |
| 2007/0007945 A1 | 1/2007 | King et al. |
| 2007/0010298 A1 | 1/2007 | Chang |
| 2007/0019356 A1 | 1/2007 | Morikawa |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0139984 A1 | 6/2007 | Lo |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0030178 A1 | 2/2008 | Leonard et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0198638 A1 | 8/2008 | Reinberger et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0046486 A1 | 2/2009 | Lu et al. |
| 2009/0072626 A1 | 3/2009 | Watanabe et al. |
| 2009/0097290 A1 | 4/2009 | Chandrasekaran |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0290385 A1 | 11/2009 | Jungreis et al. |
| 2009/0310388 A1 | 12/2009 | Yang |
| 2009/0315530 A1 * | 12/2009 | Baranwal ..................... 323/288 |
| 2010/0020578 A1 | 1/2010 | Ryu et al. |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164400 A1 | 7/2010 | Adragna |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0025289 A1 | 2/2011 | Wang et al. |
| 2011/0038179 A1 | 2/2011 | Zhang |
| 2011/0080102 A1 | 4/2011 | Ge et al. |
| 2011/0089917 A1 | 4/2011 | Chen et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0020119 A1 | 1/2012 | Tang et al. |
| 2012/0243271 A1 | 9/2012 | Berghegger |
| 2012/0294048 A1 | 11/2012 | Brinlee |
| 2013/0003430 A1 | 1/2013 | Reddy |
| 2014/0091720 A1 | 4/2014 | Brinlee |

FOREIGN PATENT DOCUMENTS

| | | |
|---|---|---|
| CN | 101202509 | 6/2008 |
| CN | 201252294 | 6/2009 |
| DE | 10310361 A1 | 9/2004 |

(56) References Cited

FOREIGN PATENT DOCUMENTS

| EP | 0665634 | 1/1994 |
|---|---|---|
| JP | 57097361 | 6/1982 |
| JP | 3-215911 | 9/1991 |
| JP | 3215911 | 9/1991 |
| JP | 2000-68132 | 3/2000 |
| JP | 2008283818 A | 11/2008 |
| WO | WO8700991 | 2/1987 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

Kuwabara, K., et al., "Switched-Capacitor DC-DC Converters," Fujitsu Limited, IEEE, 1988, Kawasaki, Japan, pp. 213-218.
Maxim, Application Note 725, www.maxim-ic.com/an725, Maxim Integrated Products, Nov. 29, 2001, 8 pages.
National Semiconductor Corporation, "LMC7660 Switched Capacitor Voltage Converter," www.national.com, Apr. 1997, 12 pages.
National Semiconductor Corporation, "LM2665 Switched Capacitor Voltage Converter," www.national.com, Sep. 2005, 9 pages.
Texas Instruments Incorporated, "LT1054, LT1054Y Switched-Capacitor Voltage Converters With Regulators," SLVS033C, Feb. 1990—Revised Jul. 1998, 25 pages.
Vallamkonda, S., "Limitations of Switching Voltage Regulators," A Thesis in Electrical Engineering, Texas Tech University, May 2004, 89 pages.
Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.
Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.
"AN100: Application Note using Lx100 Family of High Performance N-Ch JFET Transistors," AN100.Rev 1.01, Sep. 2003, 5 pp., Lovoltech, Inc., Santa Clara, CA.
"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

(56) References Cited

OTHER PUBLICATIONS

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

Ridley, R., Designing with the TL431, Switching Power Magazine, Designer Series XV, pp. 1-5, 2005.

Bill Andreycak, Active Clamp and Reset Technique Enhances Forward Converter Performance, Oct.' 1994, Texas Instruments, 19 pages.

* cited by examiner

STARTUP CIRCUIT INCLUDING FIRST AND SECOND SCHMITT TRIGGERS AND POWER CONVERTER EMPLOYING THE SAME

TECHNICAL FIELD

The present invention is directed, in general, to power electronics and, more specifically, to a startup circuit with reduced power dissipation and method of operating the same.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage that may be derived from an alternating current ("ac") source by rectification into a dc output voltage. Controllers associated with the power converters manage an operation thereof by controlling conduction periods of power switches employed therein. Some power converters include a controller coupled between an input and output of the power converter in a feedback loop configuration (also referred to as a "control loop" or "closed control loop") to regulate an output characteristic of the power converter. Typically, the controller measures the output characteristic (e.g., an output voltage, an output current, or a combination of an output voltage and an output current) of the power converter, and based thereon modifies a duty cycle of a power switch of the power converter to regulate the output characteristic. Other power converters operate in an open-loop manner wherein an output voltage is produced substantially proportional to an input voltage.

A power converter with a low power rating designed to convert an ac mains voltage to a dc output voltage to power an electronic load such as a printer, modem, or personal computer is generally referred to as an "ac power adapter" or a "power adapter," or, herein succinctly, as an "adapter." Industry standards and market needs have necessitated continual reductions in no-load and low-load power supply loss to reduce power consumed by millions of power adapters that may remain plugged in, but are not in use, or that may supply a light load level to an electronic device that is not operating at its full capacity. Efficiency requirements at low output power levels or in an idle state have become important in view of the typical load presented by an electronic device in an idle or sleep mode, or an electronic device not operating at full capacity, which are common operational states for a large fraction of the time for electronic devices such as computers and printers in a home or office environment.

To initiate the switching action of a power converter, the controller needs a source of current at a startup current level (e.g., a few milliamperes) or at a bias voltage level (e.g., 12 volts). To provide this input power at startup, a startup circuit typically draws a few milliamperes from the input power source, which may be 140 volts or more. Thus, the input power required to start the power converter may approach 0.5 watt or more, which represents a significant level of power dissipation. The startup current increases the no-load input power if the startup current is not switched off after startup. To switch off the startup current, a high voltage switch is required, which can be relatively expensive.

Thus, light-load and no-load power losses, while relatively small, have now become substantial hindrances to improving power converter efficiency as industry requirements become stricter each year. Thus, despite the development of numerous strategies to reduce power losses of power adapters, no satisfactory strategy has emerged to provide substantial reduction of power dissipation while the adapter provides minimal or no power to a load. Accordingly, what is needed in the art is a design approach and related method for a power converter (e.g., a power adapter) that enable further reduction of power converter losses without compromising product performance, and that can be advantageously adapted to high-volume manufacturing techniques.

SUMMARY OF THE INVENTION

These and other problems are generally solved or circumvented, and technical advantages are generally achieved, by advantageous embodiments of the present invention, including a startup circuit with reduced power dissipation, method of operating the same and a power converter employing the startup circuit. In one embodiment, the startup circuit for a controller includes a charge accumulation circuit having a resistor series-coupled to a capacitor and a first Schmitt trigger having an input coupled to the capacitor. The startup circuit also includes a second Schmitt trigger having an input coupled to an output of the first Schmitt trigger and configured to provide a bias voltage for the controller via the capacitor when an input voltage thereto exceeds a trip voltage.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a startup circuit configured to provide reduced power dissipation for a power converter. While the principles of the present invention will be described in the environment of a power converter, any application that may benefit from a power conversion device including a motor drive or a power amplifier is well within the broad scope of the present invention.

Figure 1:
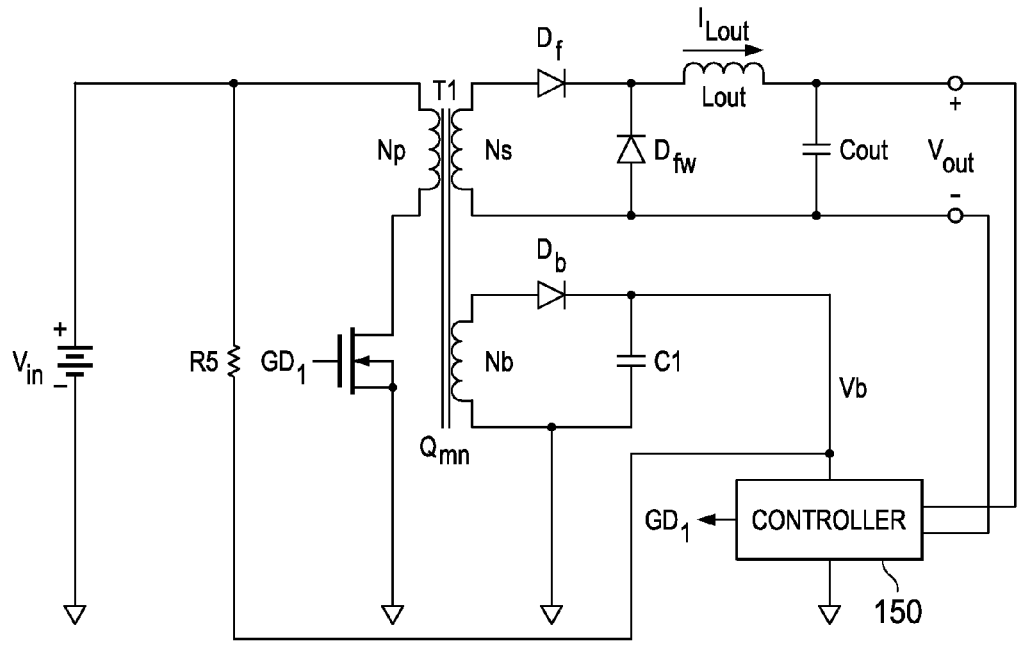
FIG. 1 illustrates a schematic diagram of an embodiment of portions of a power converter that provides an environment for application of the principles of the present invention.

Turning now to FIG. 1, illustrated is a schematic diagram of an embodiment of portions of a power converter (e.g., a forward power converter employing an active clamp) that provides an environment for application of the principles of the present invention. A power train of the power converter includes a power switch $Q_{mn}$ coupled to a source of electrical power that provides an input voltage $V_{in}$, represented in FIG. 1 by a battery. The dc input power source supplies input power to an isolating transformer T1. The transformer T1 has Np primary turns and Ns secondary turns that are selected to provide an output voltage $V_{out}$ with consideration of a resulting duty cycle and stress on power train components. The power switch $Q_{mn}$ (e.g., an n-channel MOSFET) is controlled by a controller (e.g., a pulse-width modulation ("PWM") controller 150) that controls the power switch $Q_{mn}$ to be conducting for a duty cycle D. The duty cycle D is adjusted by the pulse-width modulation controller 150 to regulate a characteristic of the output of the power converter such as output voltage $V_{out}$, an output current, or a combination thereof. The ac voltage appearing on the secondary winding of the transformer T1 is rectified by a forward diode $D_f$ and the freewheeling diode $D_{fw}$, and the dc component of the resulting waveform is coupled to the output through the low-pass output filter including an output filter inductor Lout and an output filter capacitor Cout to produce the output voltage $V_{out}$.

During a first portion of the duty cycle D, an inductor current $I_{Lout}$ flowing through the output filter inductor $L_{out}$ increases as current flows from the input through the power switch $Q_{mn}$ to the output of the power train. During a complementary portion of the duty cycle D (generally co-existent with a complementary duty cycle 1-D of the power switch $Q_{mn}$), the power switch $Q_{mn}$ is transitioned to a non-conducting state and the inductor current $I_{Lout}$ flowing through the output filter inductor $L_{out}$ decreases. In general, the duty cycle D of the power switch $Q_{mn}$ may be controlled (e.g., adjusted) to maintain a regulation of or regulate the output voltage $V_{out}$ of the power converter. In addition, the pulse-width modulation controller 150 may include an isolation device such as a pulse transformer or an opto-isolator to provide metallic isolation between the primary and secondary sides of the circuit.

To provide a bias voltage source for the pulse-width modulation controller 150, an additional winding Nb is generally formed on the transformer T1. A diode $D_b$ rectifies the voltage produced at terminals of the winding Nb, and a capacitor C1 filters the rectified voltage to produce a bias voltage Vb for the pulse-width modulation controller 150. A common requirement for the design of a power converter is to provide a bias voltage Vb for the pulse-width modulation controller 150 when the power converter is initially turned on. A circuit to provide an initial bias voltage Vb for the pulse-width modulation controller 150 is referred to as a startup circuit, which should be economically constructed to produce a competitive design for the power converter. The power converter also includes a resistor R5 and the capacitor C1 as part of a startup circuit as will be explained in more detail below.

A startup circuit is introduced herein that draws a very low level of current from a source of electrical power. The level of current drawn from the source of electrical power is sufficiently low that a high-voltage switch, which can be expensive, to disable this current after startup of the power converter is not necessary. In addition, in case of a failure of the power converter or a failure of a load coupled to the power converter, the output of the startup circuit may be required to be switched and latched off until the power converter is unpowered (i.e., input voltage is removed) for a sufficient period of time. Employing the startup circuit and related method as disclosed herein, the permanent load coupled to the source of electrical power may be less than 10 milliwatts ("mW").

The startup circuit generally includes two Schmitt triggers with an output of the first Schmitt trigger coupled to an input of the second Schmitt trigger. The first Schmitt trigger operates with a low bias current and is started when an input voltage thereto rises above a turn-on trip voltage. In accordance with a charge accumulation circuit, a parallel capacitor is charged to a startup voltage (e.g., the input voltage for the first Schmitt trigger) by a resistor with a high resistance. Once triggered, the first Schmitt trigger starts the second Schmitt trigger and latches itself on. The input voltage to turn on (i.e., the turn on trip voltage) the second Schmitt trigger is lower than that of the first Schmitt trigger. The parallel capacitor provides enough current for the startup of the second Schmitt trigger and the pulse-width modulation controller. The first Schmitt trigger stays latched until being stopped by the second Schmitt trigger.

The second Schmitt trigger starts (e.g., provides a bias voltage for) a controller (e.g., a pulse-width modulation controller). The second Schmitt trigger stays latched until an input voltage thereto falls below a turn-off trip voltage. In other words, the second Schmitt trigger remains latched as long as an input thereto exceeds a turn on trip voltage. When the input voltage falls below the turn-off trip voltage, the second Schmitt trigger generates a stop signal to the first Schmitt trigger. When the first Schmitt trigger is switched off, the first Schmitt trigger is ready for the next start. In case of a pulse-width modulation controller or load failure when the first and second Schmitt triggers are on, logic in the pulse-width modulation controller inhibits the stop signal to the first Schmitt trigger to prevent recharging the capacitor of the charge accumulation circuit. The first Schmitt trigger remains on.

In an "on" mode of the startup circuit, some current is supplied from the output of the first Schmitt trigger to the second Schmitt trigger. This current is typically too low to start the second Schmitt trigger, but high enough to keep the first Schmitt trigger switched on. In this mode, the parallel capacitor cannot be recharged to the startup voltage of the second Schmitt trigger due to the higher total current consumption of both Schmitt triggers. Thus, the pulse-width modulation controller stays off until the electronic device (powered by the power converter) is disconnected from the source of electrical power and then reconnected after a sufficiently long delay.

Figure 2:
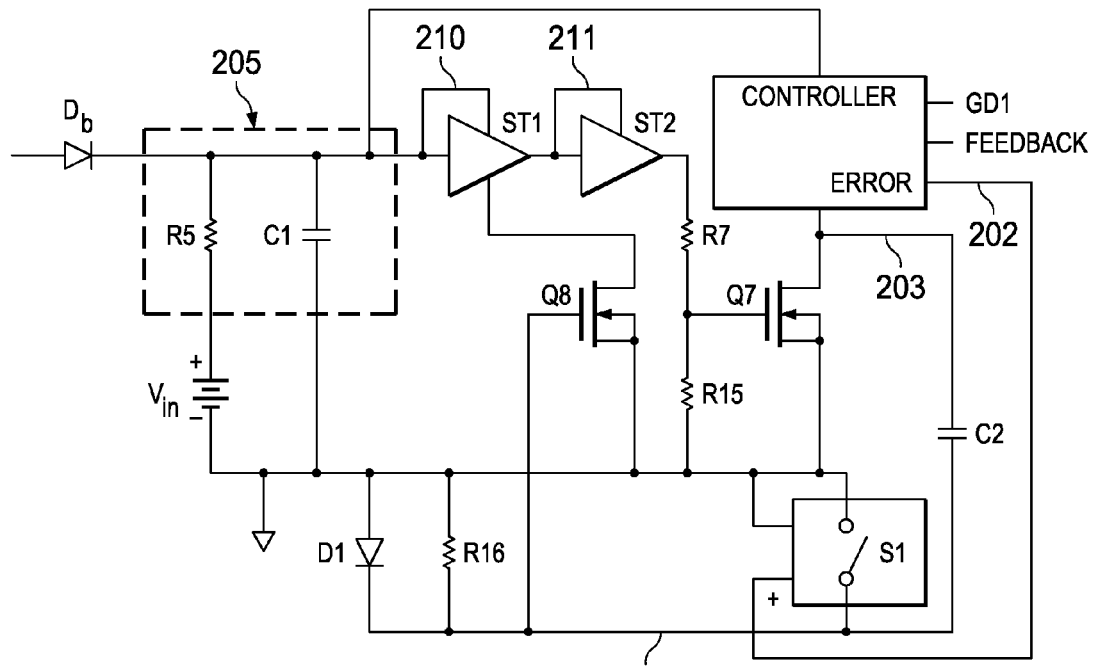
FIGS. 2 and 3 illustrate schematic diagrams of embodiments of startup circuits for a power converter constructed according to the principles of the present invention.

Turning now to FIG. 2, illustrated is a schematic diagram of an embodiment of a startup circuit for a power converter constructed according to the principles of the present invention. The startup circuit is formed with first and second Schmitt triggers ST1, ST2, wherein an output of the first Schmitt trigger ST1 is coupled to a noninverting input of the second Schmitt trigger ST2. A Schmitt trigger is generally a comparator with hysteresis between a turn-on trip voltage and a turn-off trip voltage, and may be constructed by providing feedback from the output of a comparator to its noninverting input (also referred to as "an input"). A noninverting input of the first Schmitt trigger ST1 is coupled to a charge accumulation circuit 205 formed with a resistor R5 (e.g., 27 megohms ("MΩ)") and a capacitor C1 (e.g., 100 nanofarads) that is connected in parallel with the first and second Schmitt triggers ST1, ST2. The charge accumulation circuit 205 is coupled to a source of electrical power such as a dc input voltage source for providing an input voltage $V_{in}$ (e.g., a rectified ac mains input voltage at about 350 volts), represented in FIGS. 1 and 2 by a battery, and a bias voltage source (via, for instance, a diode $D_b$ coupled to a winding Nb of a transformer T1 as illustrated in FIG. 1). In a typical power converter employable as a power adapter, the dc input voltage source may be formed with a rectifier coupled to an ac input voltage source such as an ac mains via an electromagnetic interference ("EMI") filter. In such applications, the rectifier is typically coupled to the power train of the power converter via an input capacitor. The charge accumulation circuit 205 can draw about 10 to 15 microamperes from the dc input voltage source.

The bias voltage inputs for Schmitt triggers ST1, ST2 are coupled to the respective noninverting inputs (represented by the circuit connections 210, 211, respectively). Thus, the input voltage $V_{in}$ to the noninverting inputs of the first and second Schmitt triggers ST1, ST2 are about the same voltages. The first Schmitt trigger ST1 is designed with a very low current drain (e.g., less than 5 microamperes). The first Schmitt trigger ST1 turns on when the voltage across the capacitor C1 reaches (or exceeds) its turn-on trip voltage (e.g., a startup voltage of the first Schmitt trigger ST1). The first Schmitt trigger ST1 provides an input voltage to the second Schmitt trigger ST2 as well as the bias voltage for the second Schmitt trigger ST2. The turn-on trip voltage of the first Schmitt trigger ST1 is set higher than the turn-on trip voltage of the second Schmitt trigger ST2. Thus, when the first Schmitt trigger ST1 is switched on (or conducting), the second Schmitt trigger ST2 is also switched on (or conducting). The first Schmitt trigger ST1 is configured with wide input signal hysteresis such as 12 volts to turn on and 2 volts to turn off the first Schmitt trigger ST1. The output of the second Schmitt trigger ST2 is coupled through a control switch Q7 to a controller (e.g., a pulse-width modulation controller).

When the second Schmitt trigger ST2 is switched on, a bias voltage is provided to start the pulse-width modulation controller from the capacitor C1 of the charge accumulation circuit 205. A resistor R7 (e.g., 33 MΩ) and a resistor R15 (e.g., 10 MΩ) represent a fixed portion of the load on the startup current drawn by the pulse-width modulation controller. When the pulse-width modulation controller is switched on, which is enabled by turning on a control switch Q7 (e.g., a metal-oxide semiconductor field-effect transistor ("MOSFET") such as a BS170), a higher level of current is drawn from the capacitor C1. When the first Schmitt trigger ST1 is on, the capacitor C1 of the charge accumulation circuit 205 cannot be recharged via the resistor R5.

In operation, the control switch Q7 produces an inhibit signal 203 that also is employed to switch off the first Schmitt trigger ST1, at least temporarily, if there is an interruption in the operation of the pulse-width modulation controller, thereby enabling the startup circuit to restart again after a period of time. If the pulse-width modulation controller is interrupted, a voltage is removed from the gate of the control switch Q7, which causes the voltage of the inhibit signal 203 to rise. The increased voltage of the inhibit signal 203 at the drain of the control switch Q7 is coupled to an inhibit signal bus 201 by a capacitor C2 (e.g., one nanofarad) to the control switch Q8. This turns on the control switch Q8, which pulls down the enable input of the first Schmitt trigger ST1, causing the first Schmitt trigger ST1 to turn off, which also removes the bias voltage to the second Schmitt trigger ST2. The result is the charge accumulation circuit 205 can again produce a voltage across the capacitor C1, thereby re-enabling operation of the startup circuit. Note also that the second Schmitt trigger ST2 turns off if the voltage across the capacitor C1 is too low, enabling charge to re-accumulate in the capacitor C1. A resistor R16 (e.g., 16 MΩ) enables production of a steady-state voltage on the inhibit signal bus 201 of zero volts. A diode D1 prevents the inhibit signal bus 201 from being driven negative. Thus, the control switch Q7, capacitor C2, resistor R16 and diode D1 form a portion of an inhibit circuit coupled to the first Schmitt trigger ST1. It should be noted that while the control switch Q8 may be connected to the noninverting input of the first Schmitt trigger ST1, it is preferable to connect the control switch Q8 to the enable input of the first Schmitt trigger ST1 as illustrated in FIG. 2. If the control switch Q8 was connected to the noninverting input of the first Schmitt trigger ST1, the control switch Q8 would have to discharge the capacitor C1 to reset the first Schmitt trigger ST1, which may require a large current or longer on time for the control switch Q8.

The inhibit signal bus 201 is also coupled to a control switch 51 of an inhibit circuit, which can ground the inhibit signal bus 201 in response to an error signal 202 produced by the power converter when the first and second Schmitt triggers ST1, ST2 are on. The power converter asserts the error signal 202 when an error is detected in the power converter or in the load, such as a power converter overcurrent condition. Grounding the inhibit signal bus 201 by the control switch 51 ensures that the control switch Q8 is turned off, ensuring that the first Schmitt trigger ST1, which has wide input signal hysteresis, remains on. By not resetting the first Schmitt trigger ST1, sufficient current is drawn from the capacitor C1 to prevent re-accumulation of sufficient charge in view of the large resistance of the resistor R5, thereby preventing the pulse-width modulation controller from restarting. The result is the startup circuit is disabled until the input voltage $V_{in}$ is removed from the startup circuit for a sufficient period of time to enable the capacitor C1 to discharge.

Figure 3:
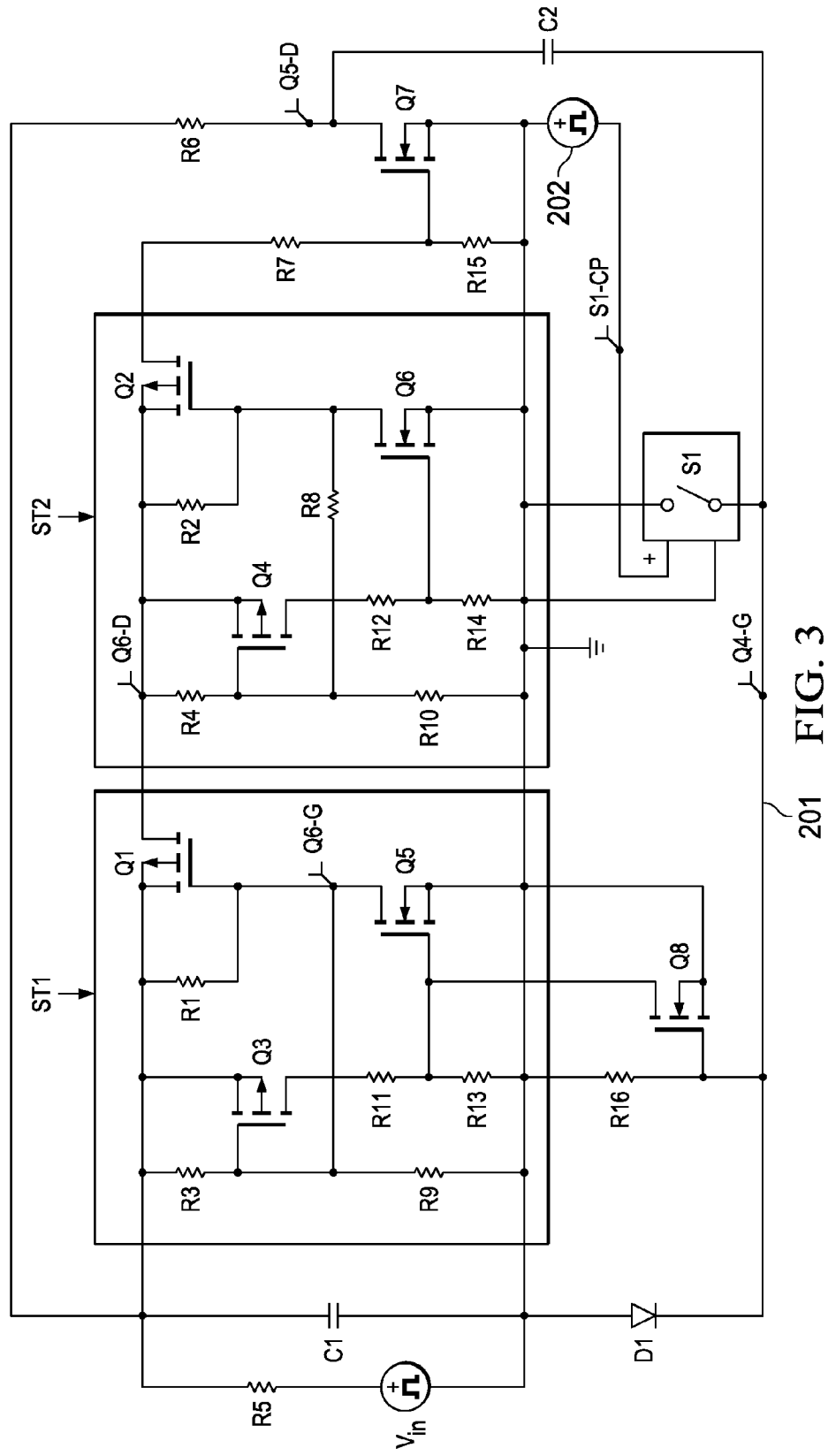

Turning now to FIG. 3, illustrated is a schematic diagram of another embodiment of a startup circuit for a power converter constructed according to the principles of the present invention. Similar components in FIGS. 2 and 3 are represented with similar reference designations. It should be noted that resistor R6 coupled to control switch Q7 represents a load presented by the pulse-width modulation controller. An important consideration for the low input current of the first Schmitt trigger ST1 is that it have a low current load, particularly when the second Schmitt trigger ST2 is in a switched off mode. Due to the low current drawn by the first Schmitt trigger ST1, the first Schmitt trigger ST1 does not draw a high bias current when switching on. This enables the first Schmitt trigger ST1 to switch on with high input/supply resistance. Another consideration is to provide a high level of positive feedback via resistors R11, R13 for the first Schmitt trigger ST1 in comparison to the level of positive feedback provided via resistors R12, R14 for the second Schmitt trigger ST2. The first Schmitt trigger ST1 also does not include a feedback resistor equivalent to the resistor R8 for the second Schmitt trigger ST1. This enables fast switching by the first Schmitt trigger ST1 so that the input voltage does not drop below the switch-on level during switching. The high level of positive feedback also causes a wide range of hysteresis, which is beneficial at the first Schmitt trigger ST1, but would not be helpful at the second Schmitt trigger ST2 because the second Schmitt trigger ST2 defines the lockout voltage level for the startup circuit.

Exemplary values for or type of the components of the startup circuit are provided in the TABLE below.

TABLE

| Component | Values or Type |
|---|---|
| Q1, Q2, Q3, Q4 | BSP171 |
| Q5, Q6, Q7, Q8 | BS170 |
| D1 | D1N4148 |
| R1, R2, R3, R4 | 33 MΩ |
| R5, R7 | 27 MΩ |
| R6 | 270 kilohms ("kΩ") |
| R8 | 100 MΩ |
| R9 | 22 MΩ |
| R10 | 15 MΩ |
| R11, R12, R13 | 3.3 MΩ |
| R14 | 220 kΩ |
| R15, R16 | 10 MΩ |
| C1 | 100 nanofarads |
| C2 | 1 nanofarad |

Also, selected circuit nodes are designated  with a reference designation.

Figure 4:
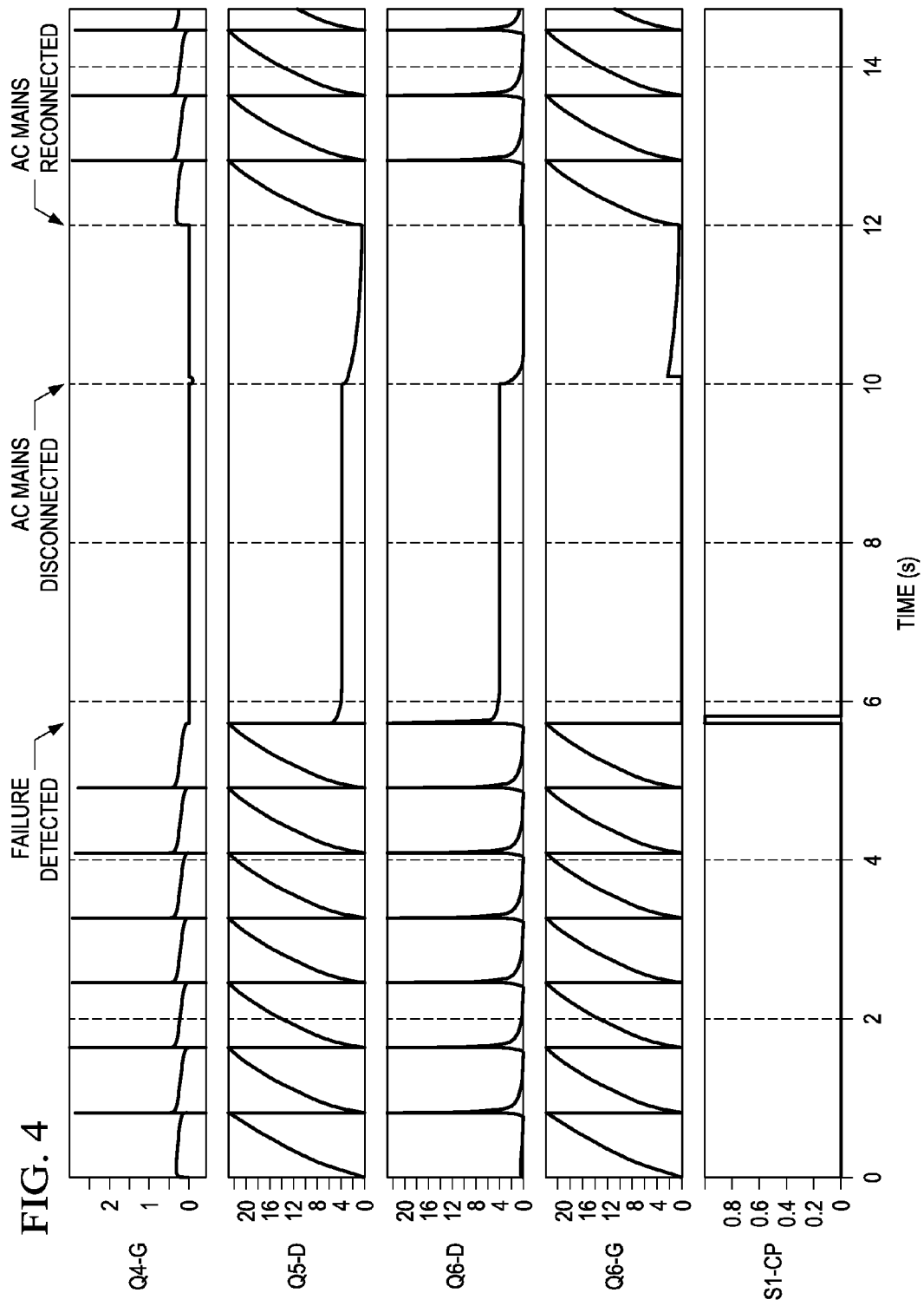
FIG. 4 illustrates a graphical representation of simulated voltages at selected circuit nodes of the startup circuit illustrated in FIG. 3.

Turning now to FIG. 4, illustrated is a graphical representation of simulated voltages at selected circuit nodes of the startup circuit illustrated in FIG. 3. Each graph represents the indicated parameter in volts. The simulation illustrates detection of a failure at approximately 5.7 seconds, after which the ac mains is disconnected at 10 seconds. The ac mains is reconnected at 12 seconds. When an error occurs (pulse at S1-CP), the control switch Q8 is turned off, ensuring that the first Schmitt trigger ST1 remains on. This condition continues until the ac mains is disconnected although the pulse at S1-CP is not present. As a result, the pulse-width modulation controller is able to stay in off mode after an error occurs until the ac mains is disconnected. The startup circuit can store information that an error has occurred.

Thus, a startup circuit employable with a controller in a power converter and a method of operating the same has been introduced herein. In one embodiment, the startup circuit for a controller (e.g., a pulse-width modulation controller) includes a charge accumulation circuit having a resistor series-coupled to a capacitor and a first Schmitt trigger having an input coupled to the capacitor. The startup circuit also includes a second Schmitt trigger having an input coupled to an output of the first Schmitt trigger and configured to provide a bias voltage for the controller via the capacitor when an input voltage thereto exceeds a trip voltage. The first Schmitt trigger is configured to draw a low bias current and the trip voltage for the second Schmitt trigger is lower than a trip voltage for the first Schmitt trigger. Additionally, the input of the first Schmitt trigger is coupled to a bias input thereof and the input of the second Schmitt trigger is coupled to a bias input thereof. The second Schmitt trigger is also configured to provide a stop signal to the first Schmitt trigger when the input voltage thereto falls below the trip voltage. The startup circuit further includes an inhibit circuit including a control switch, a capacitor, a resistor and a diode control switch coupled to the first Schmitt trigger.

In another embodiment, a method operable with a controller includes charging a capacitor of a charge accumulation circuit. The method also includes causing a first Schmitt trigger to turn on when a voltage across the capacitor coupled to an input thereof exceeds a trip voltage, and causing a second Schmitt trigger to turn on when the first Schmitt trigger is conducting. The method further includes providing a bias voltage for the controller from the capacitor when the second Schmitt trigger is conducting. The method still further includes providing a stop signal to the first Schmitt trigger when an input voltage to the second Schmitt trigger falls below a trip voltage thereto. Additionally, the method includes turning off the first Schmitt trigger via a control switch in response to an inhibit signal. Alternatively, the method includes allowing the first Schmitt trigger to continue conducting via a control switch in response to an error signal to prevent re-accumulation of a charge of the capacitor.

Those skilled in the art should understand that the previously described embodiments of a startup circuit for a power converter configured to reduce no-load or light-load losses and related methods of operating the same are submitted for illustrative purposes only. While a startup circuit to reduce no-load or light-load losses has been described in the environment of a power converter, these processes may also be applied to other systems such as, without limitation, a power amplifier or a motor controller, which are broadly included herein in the term "power converter."

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A startup circuit for a controller, comprising:
   a charge accumulation circuit having a resistor series-coupled to a capacitor;
   a first Schmitt trigger having an input coupled to said capacitor;
   a second Schmitt trigger having an input and a bias input coupled to an output of said first Schmitt trigger and configured to provide a bias voltage to power said controller via said capacitor when an input voltage thereto exceeds a trip voltage.

2. The startup circuit as recited in claim 1 wherein said first Schmitt trigger is configured to draw a low bias current.

3. The startup circuit as recited in claim 1 wherein said trip voltage for said second Schmitt trigger is lower than a trip voltage for said first Schmitt trigger.

4. The startup circuit as recited in claim 1 wherein said first Schmitt trigger provides said input voltage and a bias voltage to said second Schmitt trigger.

5. The startup circuit as recited in claim 1 wherein said second Schmitt trigger is configured to provide a stop signal to said first Schmitt trigger when said input voltage thereto falls below said trip voltage.

6. The startup circuit as recited in claim 1 wherein said input of said first Schmitt trigger is coupled to a bias input thereof and said input of said second Schmitt trigger is coupled to said bias input thereof.

7. The startup circuit as recited in claim 1 further comprising an inhibit circuit including a control switch coupled to said first Schmitt trigger.

8. The startup circuit as recited in claim 1 further comprising an inhibit circuit including a control switch and a capacitor coupled to said first Schmitt trigger.

9. The startup circuit as recited in claim 1 further comprising an inhibit circuit including a control switch, a capacitor, a resistor and a diode coupled to said first Schmitt trigger.

10. The startup circuit as recited in claim 1 wherein said controller is a pulse-width modulation controller.

11. A method operable with a controller, comprising:
charging a capacitor of a charge accumulation circuit;
causing a first Schmitt trigger to turn on when a voltage across said capacitor coupled to an input thereof exceeds a trip voltage;
causing a second Schmitt trigger, having an input and a bias input coupled to an output of said first Schmitt trigger, to turn on when said first Schmitt trigger is conducting; and
providing a bias voltage to power said controller from said capacitor when said second Schmitt trigger is conducting.

12. The method as recited in claim 11 wherein a trip voltage for said second Schmitt trigger is lower than said trip voltage for said first Schmitt trigger.

13. The method as recited in claim 11 further comprising providing a stop signal to said first Schmitt trigger when an input voltage to said second Schmitt trigger falls below a trip voltage thereto.

14. The method as recited in claim 11 further comprising turning off said first Schmitt trigger via a control switch in response to an inhibit signal.

15. The method as recited in claim 11 further comprising allowing said first Schmitt trigger to continue conducting via a control switch in response to an error signal to prevent re-accumulation of a charge of said capacitor.

16. A power converter couplable to a source of electrical power, comprising:
a power train having a power switch couplable to said source of electrical power;
a controller configured to control said power switch; and
a startup circuit, including:
a charge accumulation circuit couplable to said source of electrical power and having a resistor series-coupled to a capacitor,
a first Schmitt trigger having an input coupled to said capacitor;
a second Schmitt trigger having an input and a bias input coupled to an output of said first Schmitt trigger and configured to provide a bias voltage to power said controller via said capacitor when an input voltage thereto exceeds a trip voltage.

17. The power converter as recited in claim 16 wherein said trip voltage for said second Schmitt trigger is lower than a trip voltage for said first Schmitt trigger.

18. The power converter as recited in claim 16 wherein said first Schmitt trigger provides said input voltage and a bias voltage to said second Schmitt trigger.

19. The power converter as recited in claim 16 wherein said second Schmitt trigger is configured to provide a stop signal to said first Schmitt trigger when said input voltage thereto falls below said trip voltage.

20. The power converter as recited in claim 16 wherein said startup circuit further includes an inhibit circuit with a control switch coupled to said first Schmitt trigger.

\* \* \* \* \*